(12) United States Patent
Gonzalez et al.

(10) Patent No.: US 11,639,225 B2
(45) Date of Patent: May 2, 2023

(54) SOLID STATE RADIO FREQUENCY (SSRF) WATER HEATER DEVICE

(71) Applicant: Koninklijke Fabriek Inventum B.V., Nieuwegein (NL)

(72) Inventors: Arnau Castillo Gonzalez, Maarssen (NL); Hans Huijsing, IJsselstein (NL)

(73) Assignee: Koninklifke Fabriek Inventum B.V., Nieuwegein (NL)

( * ) Notice: Subject to any disclaimer, the term of this patent is extended or adjusted under 35 U.S.C. 154(b) by 577 days.

(21) Appl. No.: 16/783,783

(22) Filed: Feb. 6, 2020

(65) Prior Publication Data

US 2020/0172247 A1    Jun. 4, 2020

Related U.S. Application Data

(63) Continuation-in-part of application No. 15/946,636, filed on Apr. 5, 2018, now Pat. No. 10,939,511.

(51) Int. Cl.
*B64D 11/04*    (2006.01)
*H05B 6/80*    (2006.01)
(Continued)

(52) U.S. Cl.
CPC ......... *B64D 11/04* (2013.01); *A47J 27/21041* (2013.01); *A47J 27/21058* (2013.01);
(Continued)

(58) Field of Classification Search
CPC ............ A47J 27/21041; A47J 27/21058; A47J 27/21166; B64D 11/04; F24H 1/181;
(Continued)

(56) References Cited

U.S. PATENT DOCUMENTS 3,692,968 A    9/1972 Yasuoka
4,029,927 A    6/1977 McMillan
(Continued)

FOREIGN PATENT DOCUMENTS

DE    102010052448 A1    2/2012
EP    3282818 A1    2/2018
(Continued)

OTHER PUBLICATIONS

Examination Report for European Application No. 19167501.6 dated Oct. 21, 2021, 4 pages.
(Continued)

*Primary Examiner* — Ibrahime A Abraham
*Assistant Examiner* — Joseph W Iskra
(74) *Attorney, Agent, or Firm* — Suiter Swantz pc llo

(57) ABSTRACT

A solid-state radio frequency (SSRF) water heating apparatus is disclosed. In embodiments, the SSRF water heater includes a water tank, SSRF generator array and RF sensors enclosed within an RF-shielded cage. The SSRF array synthesizes RF signals in the microwave range and transmits the RF energy through the water tank, exciting and heating the water molecules without direct contact. The RF sensors at the opposite end of the tank sense residual RF energy not absorbed by the water. Control processors regulate the generation and transmission of the RF energy based on the sensed residual energy. The heated water and/or generated steam is piped to hot water dispensers, beverage makers, or steam ovens.

15 Claims, 2 Drawing Sheets

(51) Int. Cl.
  *H05B 6/64* (2006.01)
  *F24H 1/18* (2022.01)
  *F24H 9/20* (2022.01)
  *H05B 6/72* (2006.01)
  *A47J 27/21* (2006.01)
  *H05B 6/68* (2006.01)

(52) U.S. Cl.
  CPC ........ *A47J 27/21166* (2013.01); *F24H 1/181* (2013.01); *F24H 1/185* (2013.01); *F24H 9/2021* (2013.01); *H05B 6/6402* (2013.01); *H05B 6/642* (2013.01); *H05B 6/6447* (2013.01); *H05B 6/6452* (2013.01); *H05B 6/686* (2013.01); *H05B 6/72* (2013.01); *H05B 6/804* (2013.01); *F24H 2250/12* (2013.01)

(58) Field of Classification Search
  CPC .... F24H 1/185; F24H 2250/12; F24H 9/2021; H05B 6/6402; H05B 6/642; H05B 6/6447; H05B 6/6452; H05B 6/686; H05B 6/705; H05B 6/72; H05B 6/804
  USPC .......................................................... 219/678
  See application file for complete search history.

(56) References Cited

U.S. PATENT DOCUMENTS

| | | | |
|---|---|---|---|
| 5,558,800 A * | 9/1996 | Page ................. | H05B 6/72 331/110 |
| 6,064,047 A | 5/2000 | Izzo | |
| 6,462,320 B1 | 10/2002 | Fuls et al. | |
| 7,112,770 B2 | 9/2006 | Doh et al. | |
| 7,465,907 B1 | 12/2008 | Martino et al. | |
| 7,498,549 B2 | 3/2009 | Gallivan et al. | |
| 8,839,527 B2 | 9/2014 | Ben-Shmuel et al. | |
| 9,040,833 B2 | 5/2015 | Gao et al. | |
| 9,215,756 B2 | 12/2015 | Bilchinsky et al. | |
| 9,301,344 B2 | 3/2016 | Ibragimov et al. | |
| 9,332,591 B2 | 5/2016 | Libman et al. | |
| 9,609,692 B2 | 3/2017 | Bilchinsky et al. | |
| 2005/0139594 A1 | 6/2005 | Jones et al. | |
| 2009/0057302 A1 | 3/2009 | Ben-Shmuel et al. | |
| 2009/0134152 A1 * | 5/2009 | Sedlmayr ............... | H05B 6/806 219/687 |
| 2009/0236334 A1 * | 9/2009 | Ben-Shmuel .......... | H05B 6/688 219/703 |
| 2010/0115785 A1 * | 5/2010 | Ben-Shmuel ............ | H05B 6/72 34/260 |
| 2011/0049134 A1 | 3/2011 | Duncan | |
| 2012/0111856 A1 * | 5/2012 | Nobue ..................... | H05B 6/72 219/704 |
| 2015/0312971 A1 | 10/2015 | Ben-Shmuel et al. | |
| 2016/0192446 A1 | 6/2016 | Seddik | |
| 2017/0240295 A1 | 8/2017 | Ferrer et al. | |

FOREIGN PATENT DOCUMENTS

| | | |
|---|---|---|
| GB | 2248681 B | 10/1994 |
| GB | 2354688 A | 3/2001 |

OTHER PUBLICATIONS

Extended EP Search Report dated Sep. 2, 2019 for EP Application No. 19167501.6.
Goji Food Solutions, Ltd., Volumetric Cooking with Goji Technology, NPX, Jun. 2013, 3 pages.
Liu Zheng, Midea partners with NXP for new smart kitchen appliance, ChinaDaily.com.cn, http://www.chinadaily.com.cn/business/tech/2016-09/28/content_26922231.html. Sep. 28, 2016, 3 pages.
Michael Wolf, Miele Introduces The Dialog, A High-End Oven Powered by RF Solid State Cooking Technology, The Spoon, https://thespoon.tech/miele-introduces-the-dialog-a-high-end-oven-powered by-rf-solid-state-cooking-technology/, Aug. 31, 2017, 5 pages.
Extended Search Report for European Application No. 21155670.9 dated Jun. 24, 2021, 5 pages.

* cited by examiner

SOLID STATE RADIO FREQUENCY (SSRF) WATER HEATER DEVICE

CROSS-REFERENCE TO RELATED APPLICATIONS

This application claims priority under 35 U.S.C. §§ 119 and/or 120 to the following U.S. Patent Applications: U.S. patent application Ser. No. 15/946,636 entitled SOLID STATE RADIO FREQUENCY (SSRF) MICROWAVE OVEN FOR AIRCRAFT GALLEY and filed May 5, 2018. Said U.S. patent application Ser. No. 15/946,636 is herein incorporated by reference in its entirety.

TECHNICAL FIELD

The subject matter disclosed herein is directed generally to galley insert (GAIN) devices and more particularly to devices for heating and boiling water in an aircraft galley.

BACKGROUND

Operators of galley insert (GAIN) devices incorporating water systems must deal with scale formation, especially with respect to devices that heat or boil water. For example, hot water dispensers, beverage makers, steam ovens, and other like water heating devices accumulate scale as compounds settle out of the heated water onto interior surfaces and points where the water is in direct contact with heating elements. Further, conventional water heaters and water boilers may use legacy magnetron-based technology requiring special high voltage power systems.

SUMMARY

A solid state radio frequency (SSRF) water heating device is disclosed. In embodiments, the SSRF water heating device includes a Faraday cage or other like RF-shielded enclosure with a water tank disposed therein, the tank at least partially RF-transparent and containing a volume of water. The device includes an SSRF generation array at one end of the tank (e.g., adjacent to a first RF-transparent surface) wherein an RF signal source generates and amplifies RF energy transmitted through the water in the tank (e.g., from the first RF-transparent surface through the water to a second RF-transparent surface at another end of the tank) to excite and heat the water within. At the terminal end of the tank, RF sensors detect the absorbed and residual RF energy so that control processors may adjust the level of transmitted RF energy.

A solid-state radio frequency (SSRF) steam generator is also disclosed. In embodiments, the SSRF steam generator includes a Faraday cage or other like RF-shielded enclosure with a water tank disposed therein, the tank at least partially RF-transparent and containing a volume of water. The steam generator includes an SSRF generation array at one end of the tank (e.g., adjacent to a first RF-transparent surface) wherein an RF signal source generates and amplifies RF energy transmitted through the water in the tank (e.g., from the first RF-transparent surface through the water to a second RF-transparent surface at another end of the tank) to excite and heat the water within to generate steam therefrom. At the terminal end of the tank, RF sensors detect the absorbed and residual RF energy so that control processors may adjust the level of transmitted RF energy. The generated steam may be vented into an adjacent oven or galley insert (GAIN) device.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
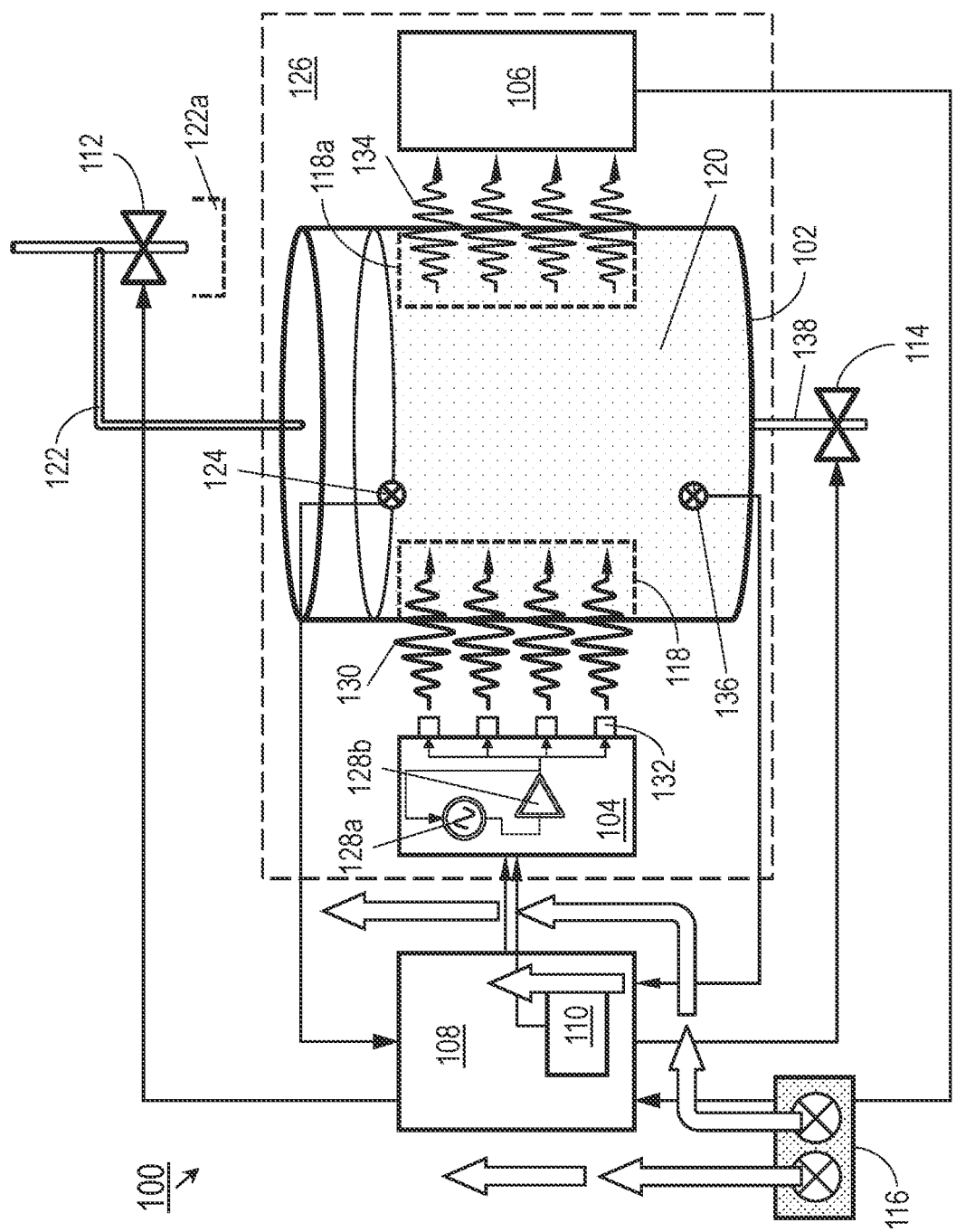
FIG. 1 is a diagrammatic illustration of a solid-state radio frequency (SSRF) water heating device according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a solid-state radio frequency (SSRF) water heater 100 is disclosed. The SSRF water heater 100 may include a tank 102, radio frequency (RF) generator array 104, RF sensor array 106 (e.g., one or more RF sensors), control processors 108, power supply 110, inlet valve 112, outlet valve 114, and chiller system 116.

In embodiments, the tank 102 of the SSRF water heater 100 may be fully or partially RF-transparent (e.g., microwave-transparent). For example, the tank 102 may be fully or partially fashioned of RF-transparent materials (e.g., plastics, composite materials, or any other appropriate material capable of passing microwave energy, radio signals, or RF fields without itself heating), or may include RF-transparent surfaces 118 to allow RF energy (e.g., microwave energy, electromagnetic (EM) signals in the microwave and radio frequency bands and capable of dielectric heating) to pass through the tank 102. The tank 102 may contain a volume of water 120 supplied by an inlet line 122 controlled by the inlet valve 112. For example, the tank 102 may be connected to an aircraft-based supply of potable water, which may be manually replenished (e.g., based on control input provided by a user to the control processors 108) or automatically refilled, e.g., if the level of the water 120 (as measured by tank level sensor 124) drops below a threshold level. In some embodiments, the inlet line 122 may include an auxiliary drain (122a) to prevent the water 120 from draining through the inlet line 122 back into the water supply. In some embodiments, the tank 102 may include a heat exchanger, serpentine tubing surrounded by a tank, or components of continuous-flow and closed systems.

In embodiments, the tank 102, RF generator array 104, and RF sensor array 106 may be enclosed within a Faraday cage or any like RF-shielded enclosure 126 (e.g., RF-sealed; may include Faraday cages or other appropriate solid, fabric, or mesh coverings of conductive materials or other appropriate materials capable of preventing generated RF fields from escaping the vicinity of the SSRF water heater 100) to prevent excess heat or residual RF energy from escaping into the galley area or elsewhere within the aircraft cabin. The RF generator array 104 may include transistor-based RF synthesizers 128a in communication with the power supply 110. The RF synthesizers 128a may generate an RF signal source (e.g., microwave energy in the 300 MHz-300 GHz range; radio signals in the 3 kHz-300 MHz range) amplified in the power stage by RF amplifiers 128b. Closed-loop control within the RF generator array 104 may provide for instantaneous feedback and adjustments to, e.g., the power level, frequency, or phase of the RF signal source as needed or desired for optimal energy efficiency. As the RF synthesizers 128a are semiconductor-based rather than magnetron-based, a low-voltage (e.g., 28 Vdc) power supply is sufficient to power the RF generator array (a high-voltage power supply, as might be associated with magnetron-powered microwave ovens, is not needed). Further, embodiments of the SSRF water heater 100 may be lighter and more reliable than conventional systems, requiring less or less frequent maintenance and operating at a lower overall cost.

In embodiments, the amplified RF energy may be transmitted (130) through the tank 102 (and the water 120 contained therein) by antenna elements 132 of the RF generator array 104. For example, the antenna elements 132 may be oriented such that the transmitted RF energy (130) passes directly through an adjacent RF-transparent surface 118 into the tank 102, toward a destination RF-transparent surface 118a at the opposite end of the tank. The water 120 may be heated or boiled via absorption of the transmitted RF energy 130. As the interior surface of the tank 102 is less susceptible to significant differences in temperature, the likelihood of scale buildup at any such surface areas may be significantly reduced. In some embodiments, any scale particles settling out of heated water 120 may be prevented from collecting into larger masses by the bombardment of transmitted RF energy (130); such particles may drift to the bottom of the tank 102 from where they may be easily drained (e.g., as a sediment layer), may re-dissolve with subsequent changes in water temperature, or may simply flow out of the tank when hot water is dispensed. In some embodiments, the path of the transmitted RF energy 130 may be indirect, e.g., conducted or reflected via one or more auxiliary surfaces between the RF generator array 104 and the tank 102.

In embodiments, any residual RF energy 134 transmitted by the RF generator array 104 but not absorbed by the water 120 within the tank 102 may be measured by the RF sensor array 106. For example, by determining the amount of transmitted RF energy (130) absorbed by the water 120 within the tank 102, the RF sensor array 106 can minimize the excess residual or reflected energy (134) by directing the control processors to adjust the transmitted RF energy via the RF generator array 104. In addition to direct tuning of the transmitted RF energy 130, the RF sensor array 106 may provide data for the control processors 108 related to the amount of transmitted RF energy absorbed by the water 120, from which the control processors may determine additional information about the state of the water within the tank 102 (e.g., the amount of water remaining in the tank (if there is no tank level sensor 124), or whether the water is contaminated in any way). In some embodiments, the SSRF water heater 100 may incorporate one or more temperature sensors 136 within the tank 102, capable of directly sensing the water temperature within the tank and reporting the sensed temperature to the control processors 108. For example, the SSRF water heater 100 may be set to boil the water 120 or, alternatively, heat the water to a precise desired temperature (e.g., an optimal temperature of 195°-205° F. for brewing coffee) selected by a user. In some embodiments, the control processors 108 may provide overheat protection by adjusting or deactivating the RF generator array 104, e.g., if the sensed interior temperature exceeds an overheat threshold or otherwise indicates the potential for overheating within the tank 102.

In embodiments, the heated water 120 may exit the tank 102 via an outlet line 138 controlled by the outlet valve 114, e.g., into a hot water dispenser, brewing device, or other vessel. The outlet valve 114 may additionally admit air into the tank 102, e.g., when the tank dispenses water or is drained. In some embodiments, the outlet valve 114 may include an overpressure valve incorporated thereinto, e.g., for venting excess steam into a safe location to relieve pressure within the tank 102.

In embodiments, the SSRF water heater 100 may include a chiller device 116. For example, the chiller device 116 may be connected by a circulating air system. Circulating air may be ducted into the chiller device 116, cooled, and then circulated around and over the control processors 108, the power supply 110, or the RF generator array 104 to absorb excess heat generated thereby.

Figure 2:
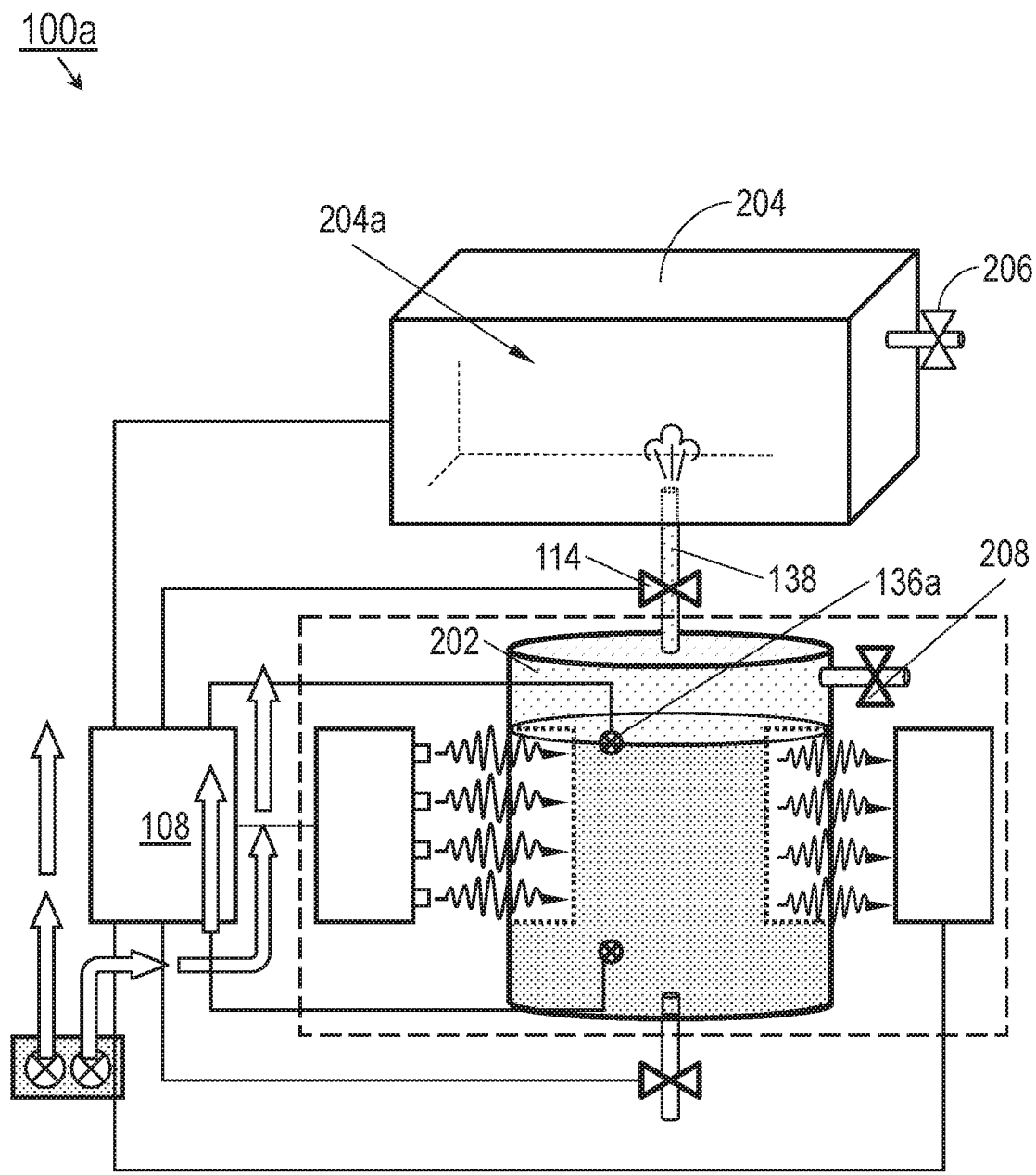
FIG. 2 is a diagrammatic illustration of a SSRF steam generator device according to example embodiments of this disclosure.

Referring to FIG. 2, the SSRF steam generator 100*a* may be implemented and may function similarly to the SSRF water heater 100 of FIG. 1, except that the SSRF steam generator may be particularly configured for the generation of steam (202) within the tank 102.

In embodiments, the SSRF steam generator 100*a* may be connected, e.g., via the outlet line 138, to a second galley insert (GAIN) device 204, e.g., a steam oven, warming compartment, or similar vessel. For example, the GAIN device 204 may be a steam oven wherein the generated steam 202 is vented into an interior environment 204*a* of the GAIN device. The generated steam 202 may be vented into the interior environment 204*a* without a limiter, or in some embodiments the generated steam 202 may be used to build pressure within the interior environment. Accordingly, the GAIN device 204 may include a pressure valve 206 (e.g., controlled by software running on the control processors 108) for venting the accumulated steam from the interior environment 204*a*. In some embodiments the SSRF steam generator 100*a* and/or the outlet valve 114 may be incorporated into the steam oven 204.

In embodiments, the SSRF steam generator 100*a* may incorporate one or more tank sensors 136*a* within the tank 102. The tank sensors 136*a* may be implemented and may function similarly to the temperature sensors 136 of FIG. 1, except that the tank sensors 136*a* may additionally sense and report humidity and pressure within the tank 102. In some embodiments, the SSRF steam generator 100*a* may include a dedicated overpressure valve 208 (e.g., separate from the outlet valve 114) for venting excess steam pressure within the tank 102.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A solid-state radio frequency (SSRF) water heating apparatus, comprising:
a radio frequency (RF)-sealed enclosure;
at least one tank disposed within the RF-shielded enclosure, the tank configured to hold a volume of water and comprising:
at least one first RF-transparent surface at a first end of the tank;
and
at least one second RF-transparent surface at a second end of the tank, the second end opposite the first end;
a solid-state RF (SSRF) array disposed within the enclosure at the first end of the tank, the SSRF array operatively coupled to a power supply and configured to:
generate RF energy in the microwave frequency range;
and
heat the volume of water by transmitting the RF energy through the tank between the first RF-transparent surface and the second RF-transparent surface;
and
control processors in communication with the SSRF array, the control processors configured to adjust the transmitted RF energy.

2. The SSRF water heating apparatus of claim 1, further comprising:
one or more RF sensors disposed within the enclosure at the second end, the RF sensors configured to measure residual RF energy associated with the transmitted RF energy;
the control processors configured to adjust the transmitted RF energy based on the measured residual RF energy.

3. The SSRF water heating apparatus of claim 1, further comprising:
at least one inlet valve operatively coupled to the tank and to a water supply, the inlet valve in communication with the control processors and configured to allow the volume of water into the tank by opening.

4. The SSRF water heating apparatus of claim 1, further comprising:
at least one outlet valve operatively coupled to the tank, the outlet valve in communication with the control processors and configured to dispense at least one of air, steam, and heated water from the tank by opening.

5. The SSRF water heating apparatus of claim 1, further comprising:
at least one overpressure valve operatively coupled to the tank, the overpressure valve in communication with the control processors and configured to vent at least one of air, steam, and heated water from the tank.

6. The SSRF water heating apparatus of claim 1, further comprising:
at least one temperature sensor disposed within the tank, the temperature sensor in communication with the control processors and configured to sense a water temperature within the tank.

7. The SSRF water heating apparatus of claim 1, further comprising:
at least one air chiller operatively coupled to an air supply, the air chiller configured to circulate chilled air over at least one of the control processors, the power supply, and the SSRF array.

8. The SSRF water heating apparatus of claim 1, wherein the tank is fully fashioned of at least one RF-transparent material.

9. The SSRF water heating apparatus of claim 1, wherein the SSRF array includes at least one of:
an RF signal source configured to generate the RF energy;
and
at least one antenna element configured for transmitting the RF energy through the tank.

10. A solid-state radio frequency (SSRF) steam generation apparatus, comprising:
a radio frequency (RF)-sealed enclosure;

at least one tank disposed within the RF-shielded enclosure, the tank configured to hold a volume of water and comprising:
  at least one first RF-transparent surface at a first end of the tank;
  and
  at least one second RF-transparent surface at a second end of the tank, the second end opposite the first end;
a solid-state RF (SSRF) array disposed within the enclosure at the first end of the tank, the SSRF array operatively coupled to a power supply and configured to:
  generate RF energy in the microwave frequency range; and
  generate a volume of steam within the tank by transmitting the RF energy through the tank between the first end and the second end;
one or more RF sensors disposed within the enclosure at the second end, the RF sensors in communication with the control processors and configured to measure residual RF energy associated with the transmitted RF energy;
control processors in communication with the SSRF array and with the one or more RF sensors, the control processors configured to adjust the transmitted RF energy based on the measured residual RF energy; and
at least one outlet valve operatively coupled to the tank, the outlet valve in communication with the control processors and configured to dispense the volume of steam from within the tank by opening.

11. The SSRF steam generation apparatus of claim 10, further comprising:
  at least one inlet valve operatively coupled to the tank and to a water supply, the inlet valve in communication with the control processors and configured to allow the volume of water into the tank by opening.

12. The SSRF steam generation apparatus of claim 10, further comprising:
  at least one tank sensor disposed within the tank, the tank sensor in communication with the control processors and configured to sense at least one of an interior temperature, a humidity level, and a pressure level within the tank.

13. The SSRF steam generation apparatus of claim 10, wherein the outlet valve is configured to vent at least a portion of the volume of steam into a galley insert (GAIN) device coupled to the SSRF steam generation apparatus via the outlet valve.

14. The SSRF steam generation apparatus of claim 10, further comprising:
  at least one overpressure valve operatively coupled to the tank, the overpressure valve in communication with the control processors and configured to vent at least one of air, water, and excess steam from the tank.

15. The SSRF steam generation apparatus of claim 10, wherein the tank is fully fashioned of RF-transparent material.

* * * * *